Jan. 20, 1942.   O. H. PADDOCK   2,270,470
METHOD OF BENDING GLASS SHEETS
Filed July 14, 1939

Inventor
ORMOND H. PADDOCK.
By Frank Fraser
Attorney

Patented Jan. 20, 1942

2,270,470

UNITED STATES PATENT OFFICE 2,270,470

METHOD OF BENDING GLASS SHEETS

Ormond H. Paddock, Rossford, Ohio, assignor to Libbey-Owens-Ford Glass Company, Toledo, Ohio, a corporation of Ohio Application July 14, 1939, Serial No. 284,537

4 Claims. (Cl. 49—84)

The present invention relates to a method of bending glass sheets or plates.

An important object of the invention is the provision of a novel method of effecting the bending of sheets or plates of glass to a predetermined curvature while suspended in a vertical position.

Another important object of the invention is the provision of a novel method of supporting the glass sheets or plates and for effecting the bending thereof in a thoroughly practical and efficient manner, with considerably less liability of breakage or cracking of the glass during the bending operation, and a greatly reduced tendency toward marring of the glass surfaces.

Other objects and advantages of the invention will become more apparent during the course of the following description when taken in connection with the accompanying drawing.

In the drawing wherein like numerals are employed to designate like parts throughout the same:

Figure 1:
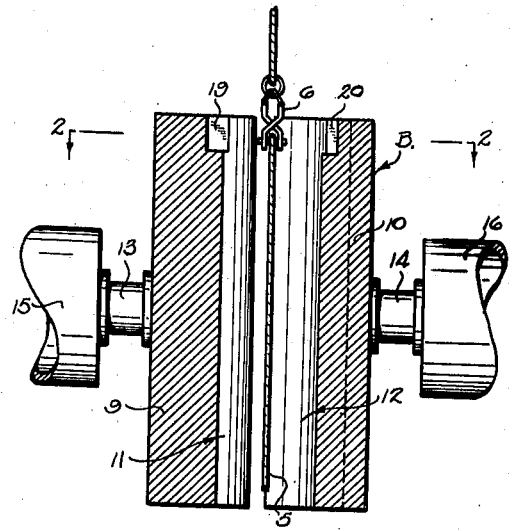
Fig. 1 is a vertical sectional view through bending apparatus constructed in accordance with the invention.
Figure 1:
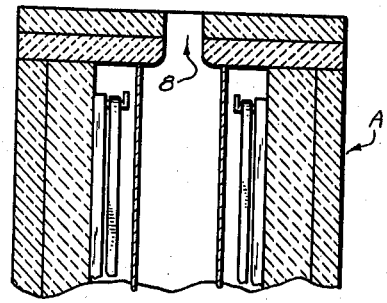
Figure 3:
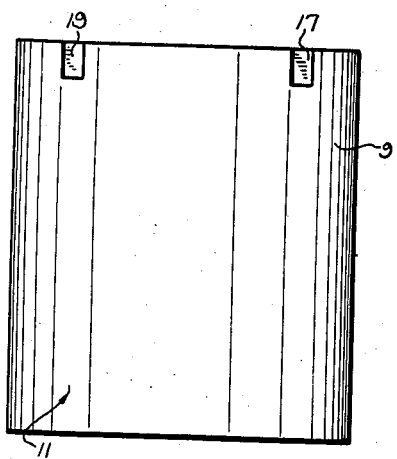
Fig. 3 is a face view of one of the bending members.

With reference now to the drawing, the letter A designates in its entirety a suitable type furnace in which the glass sheet 5 to be bent is adapted to be heated to the desired temperature for bending, while B designates generally the improved bending apparatus herein provided and shown as being mounted directly above the furnace A for receiving the heated glass sheet therefrom. The glass sheet 5 is preferably suspended vertically in the furnace from a pair of relatively small hooks or tongs 6 and 7 engaging the sheet near its upper edge and adjacent the opposite vertical side edges thereof. After the sheet has been properly heated within the furnace A, it is adapted to be lifted vertically through the opening 8 in the top thereof into position for bending as shown in Fig. 1.

Although the bending apparatus B has been illustrated in connection with a vertical type furnace A, it will be readily apparent that any suitable kind of furnace may be employed and the bending apparatus associated therewith in any desired manner. Consequently, the invention is not limited to the use of any particular type of furnace or to any particular association between the furnace and bending apparatus.

The bending apparatus B comprises the horizontally spaced convex and concave bending or mold members 9 and 10 of any preferred width and height and provided with the inner complementary convex and concave bending surfaces 11 and 12 respectively, the curvature of which relatively corresponds to the curvature to be given the glass sheet 5. The mold members 9 and 10 are movable horizontally toward and away from one another and to this end may be carried by horizontal plungers 13 and 14 operating within cylinders 15 and 16 respectively, the horizontal movement of said mold members being controlled in any well known manner by hydraulic or air pressure within said cylinders.

In accordance with the invention, the mold members are of such size both as to height and width that the glass sheet 5, when brought into position therebetween for bending, is disposed entirely within the area of said mold members. That is to say, the glass sheet does not project beyond the mold members either at the top or bottom or at the opposite sides thereof as will be seen in Figs. 1 and 2. I have discovered that when the glass sheet is arranged in this manner, the liability of breaking or cracking of the glass during bending is reduced. When the glass sheet projects either above or beneath the mold members so that said mold members do not engage the entire area of the sheet, there is a tendency for so-called chill cracks to develop in the glass where it projects beyond the mold members.

In order to suspend the glass sheet in this manner between the mold members, it is of course necessary that the lower ends of the hooks or tongs 6 and 7 be disposed between the upper portions of said mold members as seen in Fig. 1. To permit the mold members to be moved together to effect the bending of the glass sheet without interference from the said tongs, the convex and concave mold members 9 and 10 are provided at their upper ends with opposed recesses or notches 17—18 respectively for receiving the tong 6 and with similar recesses or notches 19—20 for receiving the tong 7 when the said mold members are moved together. The manner in which the tongs are received within the recesses upon closing of the mold members is clearly shown in broken lines in Fig. 2.

Another important feature of the invention consists in the positioning of the tongs 6 and 7 so that upon bending of the glass sheet, the tongs will remain in the same or substantially the same position. A flat sheet of glass 5 to be bent is shown in full lines in Fig. 2, and this sheet is suspended from the hooks or tongs 6 and 7 engaging the same adjacent its opposite vertical side edges. In operation, the convex mold member 9 is moved inwardly to engage the adjacent face of the glass sheet at a point intermediate the tongs 6 and 7, while the concave mold member 10 is simultaneously moved inwardly to engage the opposite side edge portions of the sheet outwardly of the tongs. Upon continued movement of the mold members toward one another, the central portion of the glass sheet between the tongs will be bent in one direction as indicated at $a$, while the side edge portions of the sheet, outwardly of the tongs, will be simultaneously bent in the opposite direction as at $b$ and $c$. This bending operation will continue until the mold members are closed and the sheet assumes its final predetermined curvature, as shown in broken lines in Fig. 2. When the mold members are closed, the tongs 6 and 7 will be received within the recesses 17—18 and 19—20 respectively in said mold members as explained above.

Figure 2:
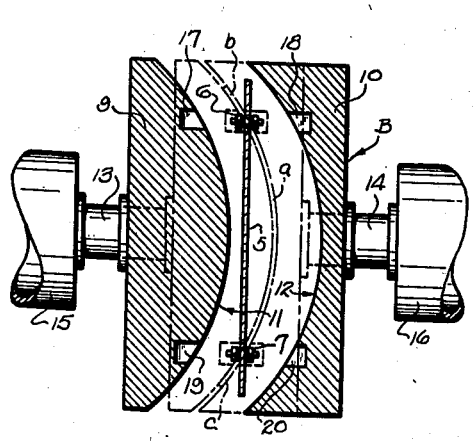
Fig. 2 is a horizontal sectional view of the bending members taken substantially on line 2—2 of Fig. 1.

As will also be apparent from Fig. 2, the tongs 6 and 7 are so arranged prior to the bending of the sheet that they have very little, if any, movement during the bending operation. This is due to the fact that the central portion $a$ of the sheet between the tongs is bent in one direction in an amount equal to the degree of bend of the side edge portions $b$ and $c$ of the sheet in the opposite direction. In other words, the tongs 6 and 7 are so positioned that a line extending parallel to the cord of the curve given the glass sheet and passing through the tongs will bisect the rise or curvature of the glass sheet after bending. The positioning of the tongs will of course depend upon the curvature to be given the glass sheet and the position of the notches in the mold members will of course also be varied accordingly.

After the glass sheet 5 has been bent, it can either be annealed by a slow and gradual cooling thereof or, if preferred, the said sheet can be tempered by subjecting it to a sudden cooling or chilling treatment as well known in the art.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. The method of bending glass sheets and the like, which consists in supporting the sheet in a vertical position, bending said sheet to a predetermined curvature between opposed bending surfaces, and maintaining the said sheet entirely within the area of said bending surfaces during the bending thereof.

2. The method of bending glass sheets and the like, which consists in suspending the sheet in a vertical position from its upper edge, bending said sheet to a predetermined curvature between opposed bending surfaces, and confining the said sheet entirely within the area of said bending surfaces during the bending thereof.

3. The method of bending glass sheets and the like, which consists in supporting the sheet in a vertical position at two spaced points of support, bending said sheet to a predetermined curvature between opposed bending surfaces, arranging said points of support with respect to one another and to the vertical side edges of the sheet so that they will remain in substantially the same position during the bending operation, and maintaining the said sheet entirely within the area of said bending surfaces during the bending thereof.

4. The method of bending glass sheets and the like, which consists in suspending the sheet in a vertical position from two spaced points of support at the upper edge thereof, bending the sheet to a predetermined curvature between opposed bending surfaces, positioning the points of support with respect to one another and to the vertical side edges of the sheet so that they will remain substantially stationary during the bending operation, and confining the said sheet entirely within the area of said bending surfaces during the bending thereof.

ORMOND H. PADDOCK.